UNITED STATES PATENT OFFICE.

EDSON P. CLARK, OF HOLYOKE, MASSACHUSETTS.

IMPROVEMENT IN COMPOSITIONS FOR INDELIBLE PENCILS.

Specification forming part of Letters Patent No. 24,195, dated May 31, 1859; reissue No. 4,899, dated May 14, 1872.

*To all whom it may concern:*

Be it known that I, EDSON P. CLARK, of Holyoke, in the county of Hampden, State of Massachusetts, have invented a new Composition for Pencils for indelibly marking on linen and other clothing, and other articles; and I do hereby declare the following to be a full, clear, and exact description of the component parts and manner of compounding the same, and of the manufacture of the same into pencils, and method of using such pencils.

The component parts of the composition are nitrate of silver, nitric acid, glue, lamp-black, and sugar. The proportions which I generally employ of said ingredients are as follows: Nitrate of silver, half an ounce; nitric acid, six to ten drops; glue, one ounce; lamp-black half an ounce; brown sugar, one dram, (one-eighth ounce.) The glue, which should preferably be of the finest kind, is to be dissolved in about one and a half ($1\frac{1}{2}$) ounce of distilled water or clear rain-water in a common glue-pot or other vessel, heated by a water-bath; and while it is hot, first the lamp-black and then the sugar are added, stirring until the former is incorporated with the glue before adding the latter, and afterward stirring again till the latter is dissolved and incorporated. The nitrate of silver is to be dissolved separately in the smallest possible quantity of distilled or clear rain-water, of which, by the addition of the nitric acid added to the solution from half ($\frac{1}{2}$) an ounce to five drams will be rendered sufficient. The compound of glue, lamp-black, and sugar is then put into an earthen or glass dish and allowed to cool for a few moments, but is kept stirred and not permitted to set; and the nitrate solution containing the nitrate acid is poured into it, and when the whole mass has been well stirred together it is spread of a thickness of about one-sixteenth ($\frac{1}{16}$) to one-eighth ($\frac{1}{8}$) of an inch upon a sheet or sheets of writing-paper, or other strong, smooth, thin paper, in such manner as to leave a clean margin all around the paper, and after it has set it is covered with clean paper of the same kind. The spread-sheet or sheets, with the covering-sheet or sheets, having the composition between them, are then subjected to a gentle pressure between two flat surfaces, which causes the covering-sheet or sheets to adhere to the composition; pressure by the hands between two flat boards will be sufficient. The sheets of paper-covered composition thus produced may be laid to dry for about twenty-four hours, and again pressed to a thickness of from one-twentieth ($\frac{1}{20}$) to one-sixteenth ($\frac{1}{16}$) of an inch, after which they may be cut like leather by a pair of scissors or by a sharp knife into small strips which I call "leads," like pencil-leads, which should be covered with sealing-wax or any other substance or composition that will give them the form of small lead-pencils and the necessary stiffness to be held in a porte-crayon and cut to a point by a pen-knife, and used like such pencils. The covering may be effected by placing the strips in molds and pouring or pressing the covering substance or composition round them, or in any other way that is used for covering pencils and crayons.

To use these pencils, the part of the cloth or fabric to be marked must be moistened. The name or other inscription can be made with one of these pencils on the moistened surface, like writing on paper with a common pencil, and should be exposed to the sun for a short time and pressed with a hot flat-iron, when it will be perfectly indelible. In this composition the nitrate of silver, the lamp-black, glue, and sugar constitute a soluble body to contain the nitrate of silver; the glue giving the requisite cohesive property and hardness, the lamp-black giving it a body and rendering the inscription at once visible, and the sugar giving it the requisite solubility in contact with the moistened surface, and preventing the composition hardening to too great a degree to be easily cut. The addition of nitric acid to the nitrate of silver solution produces a strong affinity between the pencil and the moistened surface, especially if an alkaline solution be used to moisten the cloth.

These pencils will last any length of time and are always ready for use, in which respect they are superior to marking-inks, which are liable to dry up and become useless without great care.

I do not claim the discovery of nitrate of silver for marking linen, as I am aware that it is the principal ingredient in most inks for such purposes; but I am not aware that it has been used in combination with the other or similar substances herein specified to make pencils for the same purpose; and, therefore,

What I claim as my invention, and desire to secure by Letters Patent, is—

*Claim.*

The composition for pencils for indelible writing, made by combining nitrate of silver with the several other or similar ingredients herein specified, substantially in the manner and in about the proportions set forth.

EDSON P. CLARK.

Witnesses:
R. F. HYDE,
EDWARD MORRIS.